F. M. NEEDHAM.
FOCUSING DEVICE FOR CAMERAS.
APPLICATION FILED JUNE 21, 1915.

1,176,399.

Patented Mar. 21, 1916.

Inventor:
Frank M. Needham

UNITED STATES PATENT OFFICE.

FRANK M. NEEDHAM, OF RIVERSIDE, ILLINOIS.

FOCUSING DEVICE FOR CAMERAS.

1,176,399. Specification of Letters Patent. Patented Mar. 21, 1916.

Application filed June 21, 1915. Serial No. 35,404.

*To all whom it may concern:*

Be it known that I, FRANK M. NEEDHAM, a citizen of the United States, residing at Riverside, in the county of Cook and State of Illinois, have invented a new and useful Improvement in Focusing Devices for Cameras, of which the following is a specification.

Figure 1:
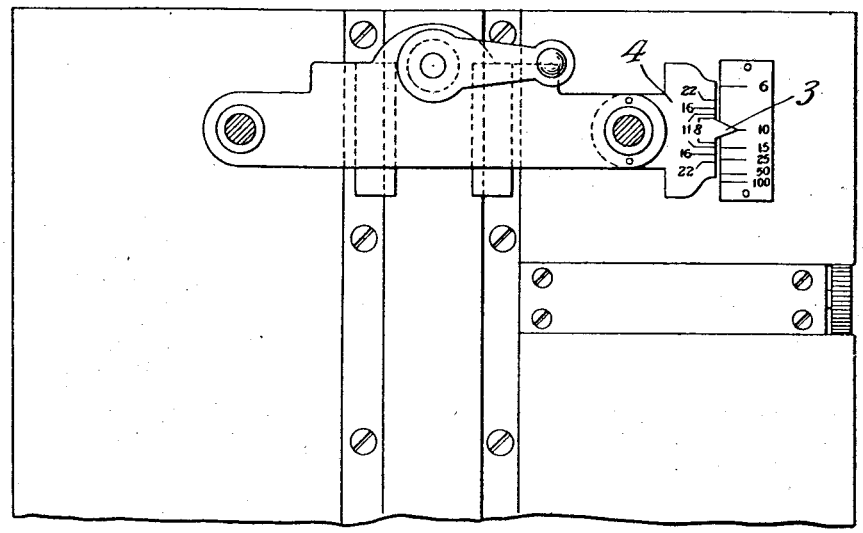
Figure 2:
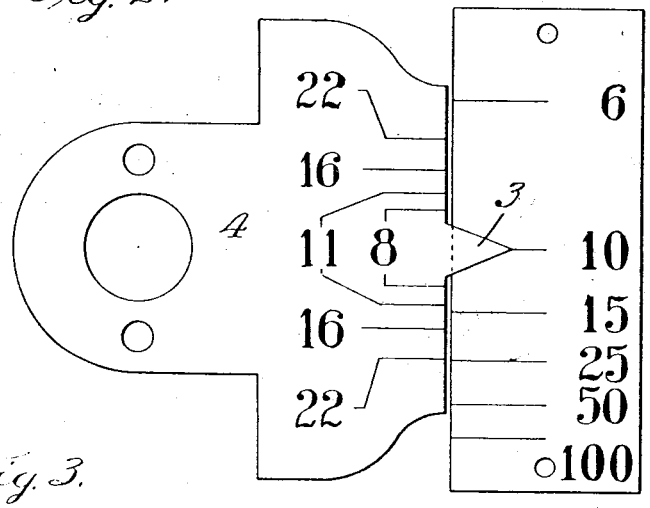
Figure 3:
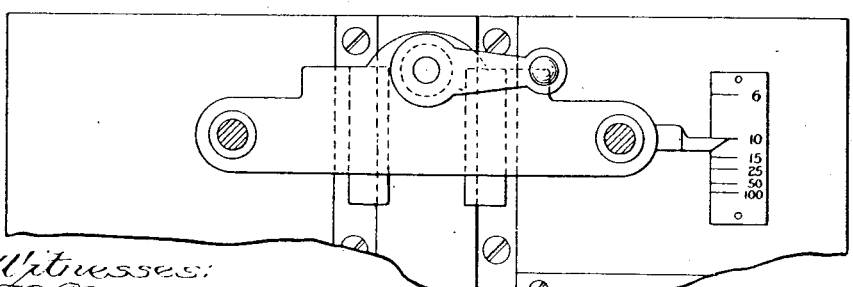
Figure 4:
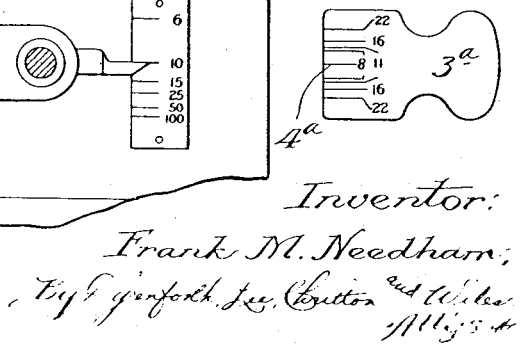

My invention relates to certain new and useful improvements in a focusing-device for cameras, and is fully described and explained in the specification and shown in the accompanying drawings, in which:

Figure 1 is a plan of the base-board of a camera and a portion of the lens-support, my device being attached thereto; Fig. 2 is an enlarged view showing the two parts of my device separated from the camera; Fig. 3 is a view of parts of an ordinary camera; and Fig. 4 is a modification of my device for use therewith.

It has heretofore been proposed to make depth-of-field tables from which it could be determined, when the camera was focused on any given object at a known distance from the camera with a given stop, how great was the depth of field, that is to say, how near to the camera would be the nearest object in clear focus and how far away from the camera would be the most distant object in clear focus. These depth-of-field tables must necessarily be calculated for lenses of each different focal length and for each stop number with that lens, and a depth-of-field table for a lens of one focal length is not adapted for use for a lens of another focal length. The calculation of these depth-of-field tables involves first determining the hyperfocal distance of the given lens for each stop number and then the calculation, with each hyperfocal distance that is determined, of the distance of the nearest and farthest objects in clear focus with each possible distance from the camera of the object which is in mathematically sharp focus.

I have devised a method for obtaining the same ultimate information about the depth of field in a very much simpler manner. It can readily be demonstrated by simple geometry that the depth of focus, meaning the distance which the sensitive plate can be moved toward or from the lens without producing circles of confusion above a predetermined diameter, is substantially independent of the focal length of the lens and for practical purposes may be said to be dependent wholly upon the stop number. This is because, with a given stop number, the cone of rays from the lens to a given point on the plate is of the same acuteness or pitch regardless of the focal length, a lens of short focal length with a given stop number forming a cone of rays of exactly the same pitch but of less height or altitude than does a lens of long focal length and the same stop number. Since the permissible circle of confusion employed in all determinations of depth of field and depth of focus is usually the same (1/100 of an inch), the plate may be moved toward or from the lens until it intercepts, on the cone of rays, sectional circles in the cone of 1/100 of an inch in diameter, without producing noticeable indistinctness of the image. This distance will be practically the same for lenses of all focal lengths, it being in inches the stop number according to the $f$-system multiplied by the fractional diameter in inches of the selected circle of confusion. If $s$ be the stop number according to the $f$-system, and the diameter of the circle of confusion selected be the usual 1/100 of an inch, then the plate may be moved in either direction from the point of mathematically clear focus $s/100$ inches. The total depth of focus is therefor $2s/100$, this depth of focus being distributed equally on the two sides of the point of mathematically clear focus.

It is, of course, obvious that in focusing on objects very close to the camera, where the lens is racked out far more than its focal length so that the cone of rays for a given stop number is elongated and thereby rendered more acute, the depth of focus will be greater. But this difference is so slight that under ordinary conditions it need not be given any consideration. The amount of this error can readily be demonstrated by geometry. If $n$ be the number of times enlargement or reduction in taking a picture, the conjugate foci of the lens are respectively $f(1+n)$ and $f(1+1/n)$. In ordinary practice, of course, the latter figure is the rear conjugate focus, the plate being $f+f/n$ behind the optical center of the lens. In ordinary practice with a hand camera the fraction $f/n$ is very small. With a 7-inch focus lens focused on an object four feet from the camera, the fraction $1/n$ will be only one-sixth and hence, since the cone of rays is elongated only one-sixth, the depth of focus would be enlarged only by one-sixth. This is an extreme condition which would seldom be reached in practice. Furthermore, if we assume the depth of field to be $2s/100$, as heretofore explained, the error will be on the safe side, and will operate in favor of greater clearness. It is therefore perfectly correct to assume that for practical purposes the depth of focus is identical with lenses of all focal lengths operating on objects at all ordinary distances from the camera. I therefore lay out a pointer 3 preferably carried by one element of the camera which is moved relative to another in focusing. In the drawings, this pointer is carried by the movable lens-support. It is provided with an index 4 of the usual form. It also has lines on the two sides of the index and at distances before and behind the same dependent upon the depth of focus with the various stop numbers. In the drawings, I have shown marks indicating the depth of focus for stops marked, according to the $f$-system, with the numbers 8, 11, 16 and 22. The distance between the two lines for the $f$-8 stop will be .16″, for the $f$-11 stop, .22″, for the $f$-16 stop, .32″, and for the $f$-22 stop, .44″, the assumption being that the permissible circle of confusion is 1/100 of an inch. In all cases these depth-of-focus lines will fall as indicated symmetrically on the two sides of the index 4. This depth-of-focus pointer indicates exactly the distance which the plate might be moved without securing an image noticeably unsharp.

The depth-of-focus pointer is preferably placed in juxtaposition to the focusing scale of the camera. When the focusing scale is properly laid out and adjusted with reference to a lens, it indicates the amount which it is necessary to move the plate to bring it into registration with the rear conjugate focus when the front conjugate focus is the distance marked on the focusing scale and the juxtaposition of the two scales, that is, the depth-of-focus pointer, and the focusing scale makes it possible to read the depth of field, that is, the range of distances in front of the camera where objects are in substantially clear focus. With the scale set, as shown in Fig. 2, it will be seen, for instance, that with the $f$-8 stop the depth of field is relatively small, it extending from approximately twelve feet to approximately nine or eight and one-half feet from the camera. With the $f$-11 stop the depth of field extends from nearly fifteen feet down to about eight feet, with the $f$-16 stop the depth of field is from about seventeen to about seven feet and with the $f$-22 stop the depth of field is from twenty-five down to about seven feet or six and one-half feet. The information thus obtained is very useful and it can be read off very quickly.

The scales can be manipulated in another manner, and for landscape work they are exceedingly useful. It is frequently desirable in landscape work to have the picture sharp to the horizon and down to some given conspicuous object in the foreground, and it is very desirable under these conditions to know the largest stop that can possibly be used. In that case the present device is manipulated as follows: The rear depth-of-focus lines are successively brought to the one hundred foot or infinity point on the focusing scale, the lens being racked out until the similarly numbered forward depth-of-focus line embraces the distance on the focusing scale of that object which it is desired to have in clear focus. The stop is then set at the size determined by the number of the depth-of-focus line employed. The horizon will then be sharp to 1/100 of an inch, the near object which it is desired to have in clear focus will similarly be sharp to 1/100 of an inch, while the point of mathematically sharp focus will fall at some intermediate point which often is of no importance to the operator. It may be noted that this point of clear focus, the location of which is shown by the point where the index lies on the focusing scale, is the hyperfocal distance for the stop number of the line which lies on infinity. This pointer thus affords a simple means for determining hyperfocal distance, and for setting the lens in position to produce a clear focus on an object at the hyperfocal distance. It is found, for instance, that with the scales here shown the $f$-22 stop will give a clear focus from the horizon to a point between eight and nine feet from the camera, the point of mathematically clear focus (*i. e.*, the hyperfocal distance) falling about seventeen feet. With the $f$-16 stop, the point of clear focus or hyperfocal distance will be about twenty-four feet and the nearest clear object will be about eleven or twelve feet from the camera. With the $f$-11 stop, the point of clear focus or hyperfocal distance will be about thirty feet from the camera, while the nearest clear object will be about seventeen feet therefrom, while with the $f$-8 stop the point of clear focus or hyperfocal distance will be about forty-five feet from the camera and the nearest clear object about twenty-five feet from the camera. These illustrations demonstrate that the arrangement will find a large field of usefulness and accordingly assists in quickly obtaining clear images since it shows graphically to the operator exactly the depth of field which he has at his disposal at all times. Furthermore, the depth of focus scale or pointer is of a single standard predetermined size and can be applied to all cameras, all the variations appearing in the focusing scale which must in any event be separately calculated for each lens. Thus in effect the predetermined depth of focus scale or pointer becomes one element of a slide-rule, while the focusing scale adapted to the particular lens employed becomes another element thereof. The two together afford the very simple means whereby depth of focus can be graphically read instead of being laboriously calculated as heretofore.

It is, of course, highly desirable that of the two relatively movable members, one be carried by and in a fixed relation to the lens of a camera, so that in setting the two members relatively to each other, the lens is set in a corresponding position. But the two members as shown in Fig. 2 and on any scale of enlargement, providing they bear the true relative proportions to each other, form a very simple calculating device from which one can obtain all the information heretofore gleaned from depth-of-field tables, and very much more quickly.

In the form of device shown in Figs. 3 and 4 I have made the depth-of-focus pointer separate from the camera, and it is then preferably made of transparent celluloid so that it can be laid over the focusing scale of the camera and the lines and indicating marks thereon be read through it. As already explained a single standard size can be used with all cameras and the device is therefore one which can be successfully marketed as a separate article of manufacture. The manner of its use depends upon the principles already set forth. In determining depth of field, the pointer or depth-of-focus scale is simply laid down over the focusing scale of any camera, with the central line or index 4ª of the depth-of-focus scale opposite the pointer which is commonly applied to the movable lens standard. The readings are made as heretofore explained. In determining hyperfocal distance, the separate scale is laid with a given stop number line opposite the infinity mark on the focusing scale and the hyperfocal distance line falls opposite the middle of the depth-of-focus scale. The camera can then be adjusted until its focusing pointer lies opposite the middle of the depth-of-focus scale, and the distance of the nearest object in clear focus can be read off from the focusing scale opposite that line on the depth-of-focus scale or pointer which bears the same number as the stop number line thereon which has previously been placed at infinity. It will be evident, of course, that this separate depth-of-focus scale or pointer is not adaptable for use with those cameras which have some sort of a multiplying device between the pointer and the lens-standard or other part which is moved in focusing, for in such cameras the focusing scale does not represent the actual distances which the lens is moved but multiples thereof and the depth-of-focus scale or pointer would have to be correspondingly enlarged. But for the very great majority of cameras in common use this separate device as shown in Fig. 4, and of the size there illustrated, is thoroughly adaptable.

I realize that considerable variation is possible in the details of the construction herein shown, and I do not intend to limit myself thereto, except as pointed out in the following claims, in which it is my intention to claim all the novelty inherent in the device as broadly as is permitted by the state of the art.

I claim as new and desire to secure by Letters Patent:—

1. The herein described depth-of-focus scale or pointer having lines arranged in pairs and disposed symmetrically on the two sides of a central point at distances proportional to the depths of focus with various stops.

2. The herein described depth-of-focus scale or pointer provided with lines arranged in pairs symmetrically on the two sides of a central point at distances equal to the depths of focus with various stops.

3. In combination two relatively movable members, one of which has lines upon it marked and spaced apart at distances proportional to the distances between the rear conjugate foci of a particular lens for the distances marked, and the other member having lines arranged in pairs symmetrically on the two sides of a central point at distances proportional to the depths of focus with different stops, said two members being placed in juxtaposition whereby the depth of field can be read on the first member opposite the depth-of-focus lines for a given stop on the second member.

4. The combination with the two parts of a camera which are relatively movable for focusing purposes, of a focusing scale upon one member of the camera and a depth of focus scale or pointer on the other movable member of the camera in juxtaposition to the focusing scale, said depth-of-focus scale having lines arranged in pairs symmetrically on opposite sides of a central point, said lines being spaced apart at distances equal to the depth of focus with various stops.

In testimony whereof I have hereunto set my hand this 14 day of June, A. D. 1915.

FRANK M. NEEDHAM.

In presence of two subscribing witnesses:
IRENE CARRIGAN,
G. NEUFELD.